Patented June 19, 1928.

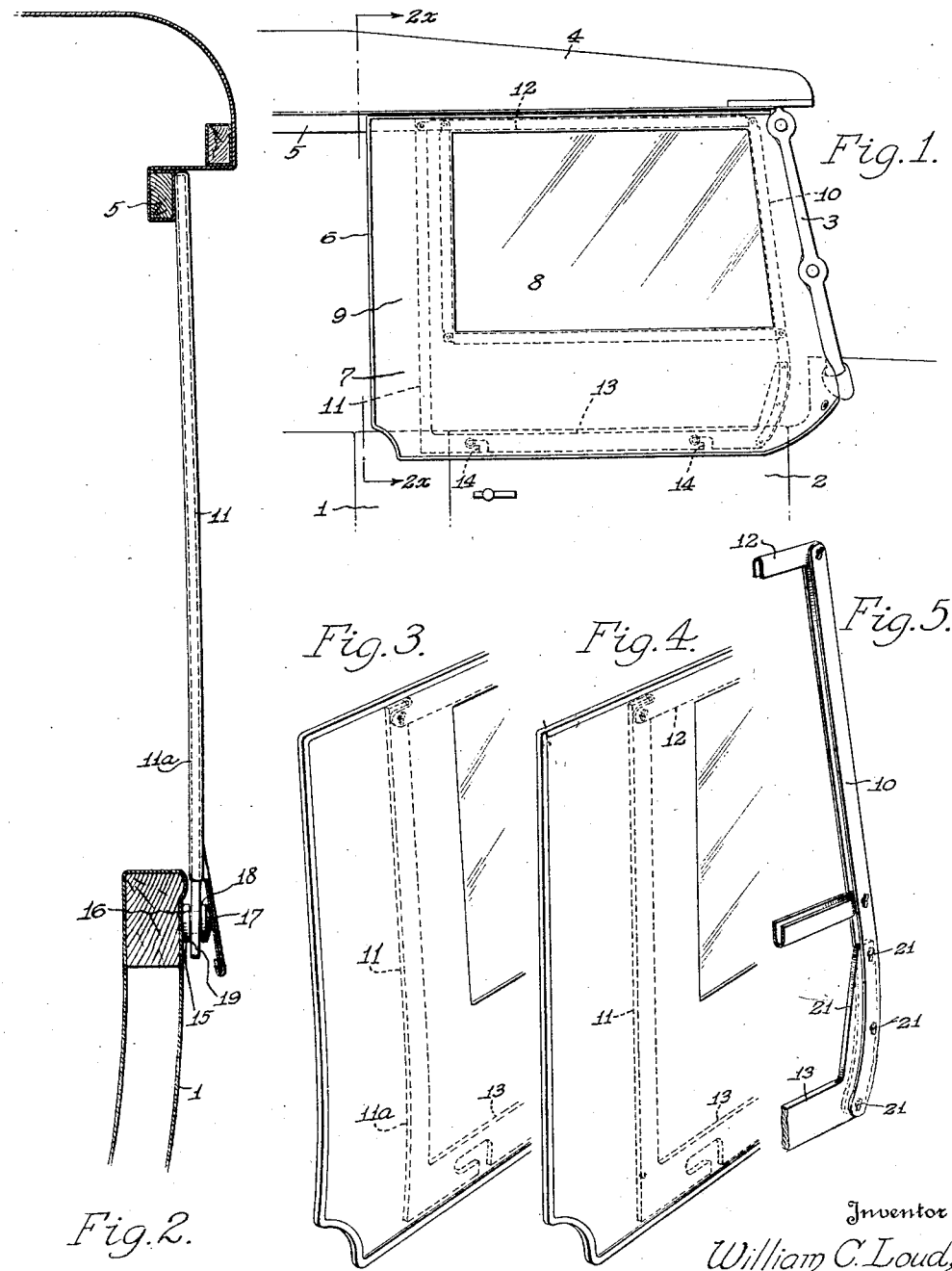

1,673,914

UNITED STATES PATENT OFFICE.

WILLIAM C. LOUD, OF DETROIT, MICHIGAN, ASSIGNOR TO GLASSMOBILE COMPANY, OF DETROIT, MICHIGAN, A CORPORATION OF MICHIGAN.

AUTOMOBILE CURTAIN.

Application filed December 1, 1924. Serial No. 753,126.

This invention has reference to the side curtains of automobiles particularly of the type in which a section or panel of such curtain is applied to and carried by the door of a car and whereby the upper part of the said panel closes upon a bar or bumper strip provided beneath the hood of the car, and the panel is further characterized by being attached to and its being detachably carried by buttons or studs on the said door of the car such as in the manner disclosed in my pending application, Serial No. 673,236, filed November 7, 1923.

My said prior application specifies the detachable nature of the panel which is slidable on its supporting studs for removal only when the door is open and is frictionally held by the bumper strip against sliding when the door is closed; and the present invention has for its object to provide an improved construction intended to more positively ensure the said binding effect when the door is closed and to provide a construction lending itself to manipulation and assembling of the panel on a door whereby adjustment of the said panel may be effected to suit the particular disposition of the bumper strip relative to the door in each case so that efficient binding action will be provided for.

It is also an object of the said invention to provide by means of such manipulation a definite tendency in the panel to be moved out of its normal plane of engagement with its supporting buttons resulting in increased frictional engagement between the frame of the panel and the said buttons when the car door is closed; and it is a still further object to provide for increased strength in the frame construction.

Still further objects subsidiary to or resulting from the aforesaid objects, or from the construction or operation of the invention as it may be carried into effect, will become apparent as the said invention is hereinafter further disclosed.

In carrying the said invention into effect, I may provide in combination with a car door and a superposed bumper strip, a panel forming part of a car curtain or enclosure, said panel being provided with a frame having bayonet joint or L-shaped slots in the lower part thereof and annularly grooved studs on the said car door adapted to enter the said slots and support the said frame and panel, the said frame being bent or offset or adapted to be bent or offset inwardly of the door whereby the upper part of the said frame is caused to engage the bumper strip prior to the complete closing of the door and throw or tend to throw the stud engaging part of the frame out of its normal plane of engagement with the studs, with consequent substantial pressure of the panel on the bumper strip and locking frictional engagement of the lower part of the frame on the supporting studs when the door is fully closed. And I may also provide the said frame with a reinforcing member or extension associated with one of the upright members of the said frame to strengthen the same and to increase its resistance against flexion from its normal plane.

All of which is more particularly described and ascertained hereinafter, by way of example, having reference to the accompanying drawing, in which Figure 1 illustrates in a fragmentary manner a car having a panel constructed in accordance with the said invention applied thereto;

Figure 2 is a transverse section taken on the line 2$^x$—2$^x$, Figure 1;

Figure 3 is a fragmentary perspective view of the panel showing the frame in its bent or offset condition;

Figure 4 is a similar view to Figure 3, illustrating the frame prior to its being bent or offset; and Figure 5 is a fragmentary perspective view of the forward end of the panel frame illustrating the reinforcement thereof.

Similar characters of reference indicate similar parts in the several figures of the drawing.

In the illustrations the vehicle body 1 is indicated as being provided with a door 2, a windshield structure 3 and a canopy 4, all of a well known type and not calling for closer description and secured beneath the said canopy 4 in any suitable manner is a longitudinally arranged bumper strip 5, this extending more or less in the same plane as the said door so that it may act as an abutment for the upper part of a panel 6 carried by the said door.

This panel is intended to form part of a curtain enclosure for a vehicle, and comprises a frame 7 within which is suitably supported a glass window 8 and which frame is enclosed or covered in any suitable manner such as by imitation leather 9, the said frame including front and rear upright members 10 and 11 and upper and lower horizontal members 12 and 13 respectively.

The lower member 13 is provided with L-shaped or bayonet slots 14 and the door with studs 15 each having a shoulder 16 and a head 17 between which the lower part 13 of the frame is received when the studs are entered into the slots, as clearly seen in Figure 2 of the drawing, in which figure the proportions of the said stud and the thickness of the frame with which it engages are somewhat exaggerated for the sake of more clearly illustrating the locking action hereinafter described. In practice, the space between the said shoulder 16 and head 17 much more closely approaches the thickness of that part of the frame 13 with which the stud engages.

Application and removal of the said panel to and from the door is accomplished by the sliding of the said panel on the said studs in one or other direction by reason of the presence of the said bayonet slots as will be quite apparent, and it is desirable that such sliding of the panel may be prevented when the door of the vehicle is closed, so that, with this object in view, the bumper strip is utilized not merely as a means of excluding rain and draft from a vehicle when the door is closed, but to engage the panel in a manner preventing such undesirable movement of the panel. In this respect, the friction between the upper part of the panel and the said bumper strip offers a resistance to such movement, and by suitable co-relation between the normal position of the panel with respect to the studs and the position of the upper part of the panel which engages the bumper strip a disturbance of such normal engagement of the frame with the studs may be effected upon the closing of the door to an extent which will result in the setting up of forces between the said frame and the said studs with consequent frictional engagement therebetween which will very effectively lock the frame on the said studs when the said door is closed.

To do this, the panel is adapted to engage the bumper strip prior to the complete closing of the door so that the continued closing thereof is effected without further inward movement of the upper part of the said frame which tends to rock the said frame outwardly on the studs, as illustrated in an exaggerated manner in Figure 2 wherein it will be seen that the lower part 13 of the frame is caused to bind upon the upper part of the stud head 17, at 18, and upon the lower part of the shoulder 16, at 19, thereby bringing about the desired frictional engagement at these points.

It will be understood, however, that the bumper strips 5 may not necessarily be always arranged in the precise position relative to the door to bring about this result, and to meet such conditions the vertical member 11 of the frame is of a sufficiently flexible nature to permit of its being bent, as at 11ª in Figure 3, so that the upper end thereof will be thrown inwardly of the door, this causing the same member 11 to act very much as a strong spring, the action of which may be increased or decreased by the increasing or decreasing of the extent to which it is bent in the manner suggested.

The means described although being very simple are nevertheless extremely effective and permit the utilizing of a simple bayonet joint and stud means of attachment and support without the disadvantages of looseness or slipping which might ordinarily be expected in such a construction and without necessitating auxiliary locking means for the securing of the panel in its applied position. Therefore, such a panel may be readily applied and removed to and from a vehicle as often as desired with dispatch and ease, but is firmly held against rattling or undesirable movement when the vehicle is in use and the door bearing the panel is closed, the ordinary unassisted engagement of the frame with its studs being quite sufficient to support the panel when the door is open as in this case the vehicle is seldom in motion and not subjected to excessive jolting or vibration.

For the sake of lightness and for other reasons of utility or manufacturing expediency, the member 10 of the frame may be of considerably lighter construction than the member 11 which is bent in the manner described. For instance, it may be of channel formation as illustrated, and to reinforce this member 10 about the lower parts thereof I may provide the member 13 at its forward end with an upwardly extending arm 20 extending along and supporting the said lower portion of the said member 10 as shown, the said arm 20 in this instance entering the channel of the said member 10 of the frame and being secured therein by rivets 21. This overcomes any tendency of the lighter frame member 10 to be bent or distorted at the lower end thereof, where it meets the member 13, as might otherwise occur; and the said member 20 also provides a means which may be bent for the purpose of bringing the upper end of the member 10 in closer relation to the bumper strip where otherwise the position of the said bumper strip would not result in a proper engagement of the upper end of the panel therewith throughout its length.

This invention may be developed within the scope of the following claim without departing from the essential features of the said invention, and it is desired that the specification and drawing be read as merely illustrative and not in a limiting sense, except as necessitated by the prior art.

What I claim is:—

In a curtain panel of the type described, a frame including a horizontal member adapted to be secured to the door of a car, a vertical member at one end thereof of heavy construction and adapted to offer substantial resistance against flexion, a further vertical member of lighter construction, and an extension on said horizontal member reinforcing the lower part of said lighter member.

In testimony whereof I affix my signature.

WILLIAM C. LOUD.